United States Patent
Eisenhauer et al.

(10) Patent No.: US 6,624,900 B1
(45) Date of Patent: Sep. 23, 2003

(54) OPTICAL SENSOR

(75) Inventors: Karl Yarnos Eisenhauer, Glen Forrest (AU); John Baxter, Chatswood (AU)

(73) Assignee: Bishop Innovation Limited, North Ryde (AU)

( * ) Notice: Subject to any disclaimer, the term of this patent is extended or adjusted under 35 U.S.C. 154(b) by 0 days.

(21) Appl. No.: 09/830,579

(22) PCT Filed: Nov. 5, 1999

(86) PCT No.: PCT/AU99/00973
§ 371 (c)(1),
(2), (4) Date: Jul. 27, 2001

(87) PCT Pub. No.: WO00/28285
PCT Pub. Date: May 18, 2000

(30) Foreign Application Priority Data

Nov. 10, 1998 (AU) .............................. PP 7040

(51) Int. Cl.$^7$ .............................. G01B 11/14
(52) U.S. Cl. ...................................... 356/614
(58) Field of Search ................ 250/221, 229, 250/237, 231.18, 227.13; 345/165, 167; 356/614, 375

(56) References Cited

U.S. PATENT DOCUMENTS

| 5,001,937 A | 3/1991 | Bechtel et al. |
| 5,490,430 A | 2/1996 | Anderson et al. |
| 5,703,356 A | * 12/1997 | Bidiville et al. ............ 250/221 |

FOREIGN PATENT DOCUMENTS

| CA | 9624475 A | 2/1975 |
| DE | 4243778 A | 6/1994 |
| DE | 19705312 A | 8/1998 |
| EP | 0185619 A | 6/1996 |

OTHER PUBLICATIONS

Patent Abstracts of Japan, P566, p. 44, JP 61–262603A (Hitachi Ltd) Nov. 20, 1986.

* cited by examiner

Primary Examiner—Tu T. Nguyen
(74) Attorney, Agent, or Firm—Arent Fox Kintner Plotkin & Kahn, PLLC

(57) ABSTRACT

A sensor for determining the position of a moveable surface having patterned regions is disclosed. The sensor includes an ASIC, at least one lens, and at least one EMR source. The ASIC includes at least one array of EMR sensitive detectors and processing means. The EMR source illuminates the surface. The lens focuses the reflected EMR from the surface and generates an image on the array of EMR sensitive detectors corresponding to the pattern on the surface. The ASIC, the one lens, and the one EMR source are all enclosed in a single housing providing accurate optical alignment of these elements and integrated as a single replaceable module. The processing means of the ASIC processes the image to determine the position of the pattern on the surface. The ASIC and the EMR source are both mounted on a PCB and the PCB is mounted in the housing.

8 Claims, 4 Drawing Sheets

OPTICAL SENSOR

TECHNICAL FIELD

This invention relates to optical sensors for determining the position of one or more moveable surfaces where the surfaces comprise patterned regions of high and low reflectivity to electromagnetic radiation (EMR). Such moveable surfaces are found in displacement sensors, angle sensors and torque sensors.

BACKGROUND

Typically, such sensors consist of at least one EMR source illuminating a patterned region on at least one moveable surface, at least one lens or other focussing means to focus the EMR reflected from the surface(s), and at least one EMR sensitive array to receive the focussed image. The pattern consists of regions of high and low reflectivity to the EMR emitted from the source(s), and is typically either marked on, attached to, or otherwise applied to the respective moveable surface. The pattern may have a constant period, but may also encrypt absolute position information via a formatted barcode. Such sensors also require means of processing the image to decrypt meaningful information relating to the position of the moveable surface(s), and also means of outputting this information. In co-pending International Patent Application No. PCT/AU98/00645 these functions are achieved by the array architecture forming part of an Application Specific Integrated Circuit (ASIC). In the present specification, the combination of all these components, including the respective moveable surface(s), will be termed a "sensing system".

In the case of linear displacement sensing systems, the pattern is applied to the surface of a translating plate. An example of a linear displacement sensing system using this principle is disclosed in International Patent Publication WO97/03338. In this patent the moveable surface has two patterns, each of high and low reflectivity. A coarse pattern is used for gross position measurement and a fine pattern for accurate position measurement.

In the case of angular displacement sensing systems, the pattern is usually applied to a cylindrical surface, with the illumination and reflection of EMR occurring in a substantially radial direction, or on a disk-like surface, with the illumination and reflection of EMR occurring in a substantially axial direction. Many other axisymmetric shapes can also be used. An example of an angular displacement sensing system of the type described is disclosed in German Patent Application DE19705312. In this patent the arrangement of EMR illumination, focussing lens, array and processing architecture is clearly shown.

A torque sensing system can also be constructed by utilising multiple arrays (or, for example, a single two dimensional array) and having patterns which change position circumferentially relative to each other as a function of applied torque. An example of such a device is disclosed in co-pending International Patent Application No. PCT/AU98/00645. This patent shows a number of possible arrangements of utilising the basic principle described above to measure torque.

In all of these embodiments, the sensing system is supported within an enclosure. This enclosure serves to eliminate contamination of the moveable patterned surface(s) by foreign material or extraneous EMR. The electrical components which make up the sensing system, are usually mounted within this enclosure on a Printed Circuit Board (PCB), while the other fixed components such as the focussing lens (and ancillaries) are usually mounted separately within the enclosure. The fixed components of the sensing system require accurate alignment to each other and, in turn, these require to be correctly spatially positioned with respect to the moveable surface(s). All previous designs of such devices have required disassembly of the enclosure to repair or replace all or part of the sensing system which, if not carried out by skilled personnel, may result in corruption of this alignment and spatial positioning of the fixed and moveable sensing system components. This, in turn, will dramatically degrade the optical and electronic performance of the sensing system.

The essence of the present invention resides in the provision of a removable sensor module containing all the fixed components of the sensing system. These fixed components are therefore accurately mutually aligned and integrated within the housing of the sensor module. The sensor module can be then installed into the enclosure, the latter surrounding the moveable surfaces of the sensing system, via an aperture in the enclosure designed to provide accurate "datums" for mounting the sensing module. In this way the fixed components of the sensing system (in the sensor module) are aligned with, and accurately spatially mounted with respect to, the moveable surface(s) within the enclosure. Moreover, replacement of the fixed components of the sensing system can now be readily achieved by untrained personnel via replacement of the sensor module as a single component, while maintaining accurate alignment and spatial positioning of the fixed and moveable components of the sensing system.

SUMMARY OF INVENTION

The present invention consists of a sensor for determining the position of a moveable surface having patterned regions of high and low reflectivity to EMR, the sensor comprising an ASIC, at least one lens, and at least one EMR source, the ASIC comprising at least one array of EMR sensitive detectors and processing means, the EMR source facilitating illumination of the surface and the at least one lens facilitating the focussing of reflected EMR from the surface and generating an image on the at least one array of EMR sensitive detectors corresponding to the pattern on the surface, characterised in that the ASIC, the at least one lens, and the at least one EMR source are all enclosed in a single housing providing accurate optical alignment of these elements and integrated as a single replaceable module, and the processing means of the ASIC facilitates processing of the image to determine the position of the pattern on the surface.

It is preferred that the housing of the sensor also comprises an electrical connector and the processing means also facilitates the outputting of a digital or analog electrical representation of the position to the electrical connector.

It is preferred that the electrical connector comprises a multi-pin plug.

It is preferred that the EMR emitted by the at least one EMR source passes through a light guide.

It is preferred that the multi-pin plug also provides electrical power to the sensor.

It is preferred that the at least one lens forms part of a lens system, the lens system comprising at least two lenses separated by an iris.

It is preferred that the at least one lens is any one of a refractive, reflective or diffractive optical component.

It is preferred that the at least one EMR source comprises a Light Emitting Diode (LED).

It is preferred that the ASIC is mounted on a PCB and the PCB is mounted in the housing.

In some embodiments of the present invention all the opto-electronic components which make up the sensor module, including the ASIC and LEDs, are mounted on a single PCB using Surface Mount Devices (SMDs). The LEDs may have focussing lenses integrated into their bodies or, alternatively, one or more light guides may be used to convey EMR from the LEDs to the moveable surface(s) in order to minimise optical losses. This light guide may consist of a moulded transparent plastic tubular or solid section or, alternatively, fibre optic technology may be employed.

Opto-electronic position sensing systems, of the type described in reference to the present invention, rely on a discrete (ie. non-continuous) image sampling process. It is therefore preferred that the LEDs are intermittently pulsed according to a predetermined duty cycle with a high "on" current for a very short time period. The "on" current can in fact equate to many times the steady state current capability of the LEDs. This allows much higher instantaneous optical power emissions to be achieved without damaging the LEDs. It also "strobes" the pattern on the moveable surface (s) and hence reduces "smearing" of the focussed image on the array(s) at higher velocities of these surface(s). It is preferred that the control of the duty cycle of the LEDs is also included in the ASIC architecture.

Preferably the at least one array, which forms part of the ASIC, is either a one or two dimensional array and uses either photodiode or Charged Couple Device (CCD) technology.

The at least one lens focuses the reflected EMR from the moveable surface and produces a sharp image on the array (s) in the ASIC. The mounting of the lens(es) inside the housing of the sensor module ensures that its focal properties and the geometric relationship between the moveable surface(s), the lens(es) and the ASIC are not disturbed if the sensor module is removed or replaced. The lens may comprise a classical curved refractive component which focusses EMR transmitted through the lens material. Alternatively the lens may comprise a reflective curved component which focusses impinging EMR reflected from the internal or external surface of the lens material. Either of these refractive or reflective lenses may have optical surfaces consisting of simple continuous curved surfaces (e.g. spherical or parboloidal) or, alternatively, the surfaces may be discontiuous in the form of a Freznel arrangement. In a further alternative embodiment the lens may be arranged as a diffractive component.

Where the sensor module forms part of the earlier referred to linear displacement sensing systems, linear displacement, velocity and acceleration of the moveable surface can also be calculated by analog and/or digital processing on the ASIC based on the position of the moveable surface at each time sample.

Where the sensor module forms part of the earlier referred to angular displacement sensing systems, angular displacement, angular velocity and angular acceleration can also be calculated by analog and/or digital processing on the ASIC based on the position of the cylindrical, disk-like or otherwise axi-symmetric moveable surface at each time sample.

Where the sensor module forms part of the earlier referred to torque sensing systems, torque, rate of change of torque and torque acceleration, in addition to those variables mentioned above in reference to angular displacement sensing systems, can also be calculated by analog and/or digital processing on the ASIC. In this embodiment the ASIC typically has at least two one dimensional arrays, at least one array detecting each pattern. Alternatively a single two dimensional array may be incorporated on the ASIC. The torque-based variables mentioned above are calculated at each instant of time by measuring the differential position of two separated moveable surfaces connected by a member of predetermined torsional stiffness. Suitable processing algorithms are disclosed in co-pending International Patent Application No. PCT/AU98/000645 and enable measurement of torque in a stationary as well as a rotating shaft and also, for certain embodiments employing bar coded patterns, the absolute angular position of a stationary as well as a rotating shaft.

It is preferred that the processing means provides a fixed protocol for output from the electrical connector of the sensor module. There are many known protocols for communicating the output to other devices, for example analog voltage, pulsed width modulation (PWM) and various serial protocols can be used. The output protocols can also be "split" between a number of electrical output conductors within the electrical connector, that is between the wires or plug pin connections. In one embodiment one output protocol of the sensor module is an analog voltage proportional to torque on one conductor, and a simultaneous serial output protocol communicating angular displacement on another conductor. In another embodiment a single high-level serial output protocol is used to output the value of all variables from the sensor module, such as a Controller Area Network (CAN) protocol.

It is preferred that the EMR source(s) and ASIC be powered from the same voltage source. This source preferably connects to the sensor module via the same electrical connector which contains the conductors for output communication. This electrical connector may be integrated as part of the sensor module housing or, alternatively, may be at the end of a wiring harness and remote from the sensor housing if required.

It is preferred that the sensor module housing is injection moulded from an engineering plastic and the internal components of the sensor module moulded "in situ". This provides rigid support to these internal components, as well as preventing unauthorised disassembly of the sensor module, the latter which may disturb the alignment and spatial positioning of these internal components.

BRIEF DESCRIPTION OF DRAWINGS

The present invention will now be described by way of example with reference to the accompanying drawings, in which.

MODE OF CARRYING OUT INVENTION

Figure 1:
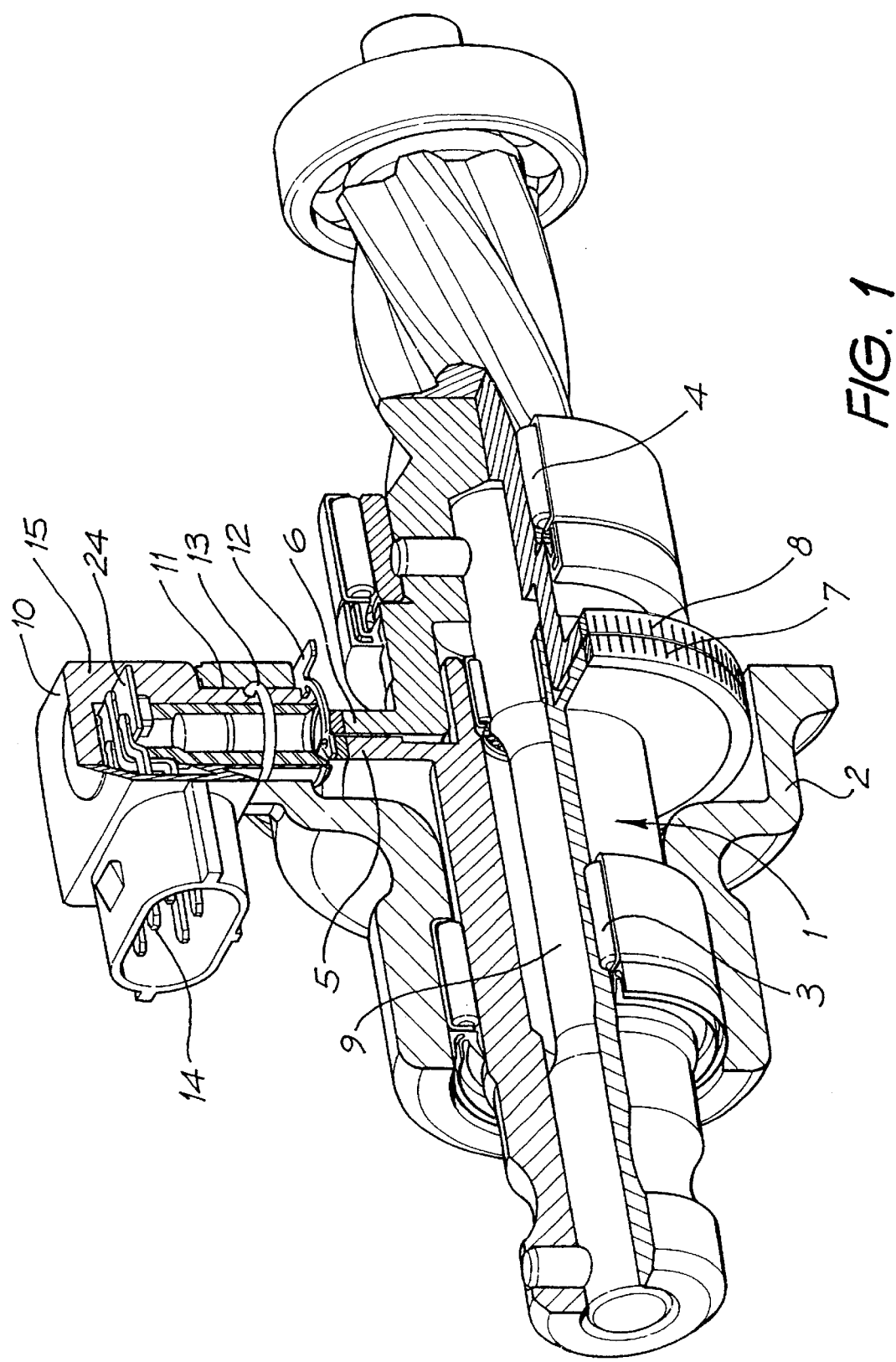
FIG. 1 shows a sectioned isometric view of an vehicle electric power steering (EPS) torque, absolute angle and angular velocity sensing system showing an embodiment of the sensor module.

FIG. 1 shows rotor assembly 1 mounted in enclosure 2 via roller bearings 3 and 4, and forming part of an opto-electronic torque, absolute angle and angular velocity sensing system for an electric power steering (EPS) system for a vehicle. Two patterned disks 5 and 6, comprising cylindrical laser-patterned surfaces 7 and 8 respectively, are rotationally connected by torsion bar 9. A torque applied to rotor assembly 1 therefore causes a small relative circumferential displacement of patterned surfaces 7 and 8 proportional to this torque. Also rotation of rotor assembly 1 causes simultaneous (and potentially larger magnitude) circumferential displacement of patterned surfaces 7 and 8.

Sensor module 10 is partially inserted in mounting aperture 11 of enclosure 2 and is retained by circlip 12. O-ring 13 is also part of sensor module 10 and seals the interface between enclosure 2 and sensor module 10. An electrical connector in the form of multi-pin plug 14 is moulded in situ as part of plastic injection moulded housing 15 of sensor module 10, and facilitates electrical connection of the module to related EPS and vehicle systems.

Figure 2:
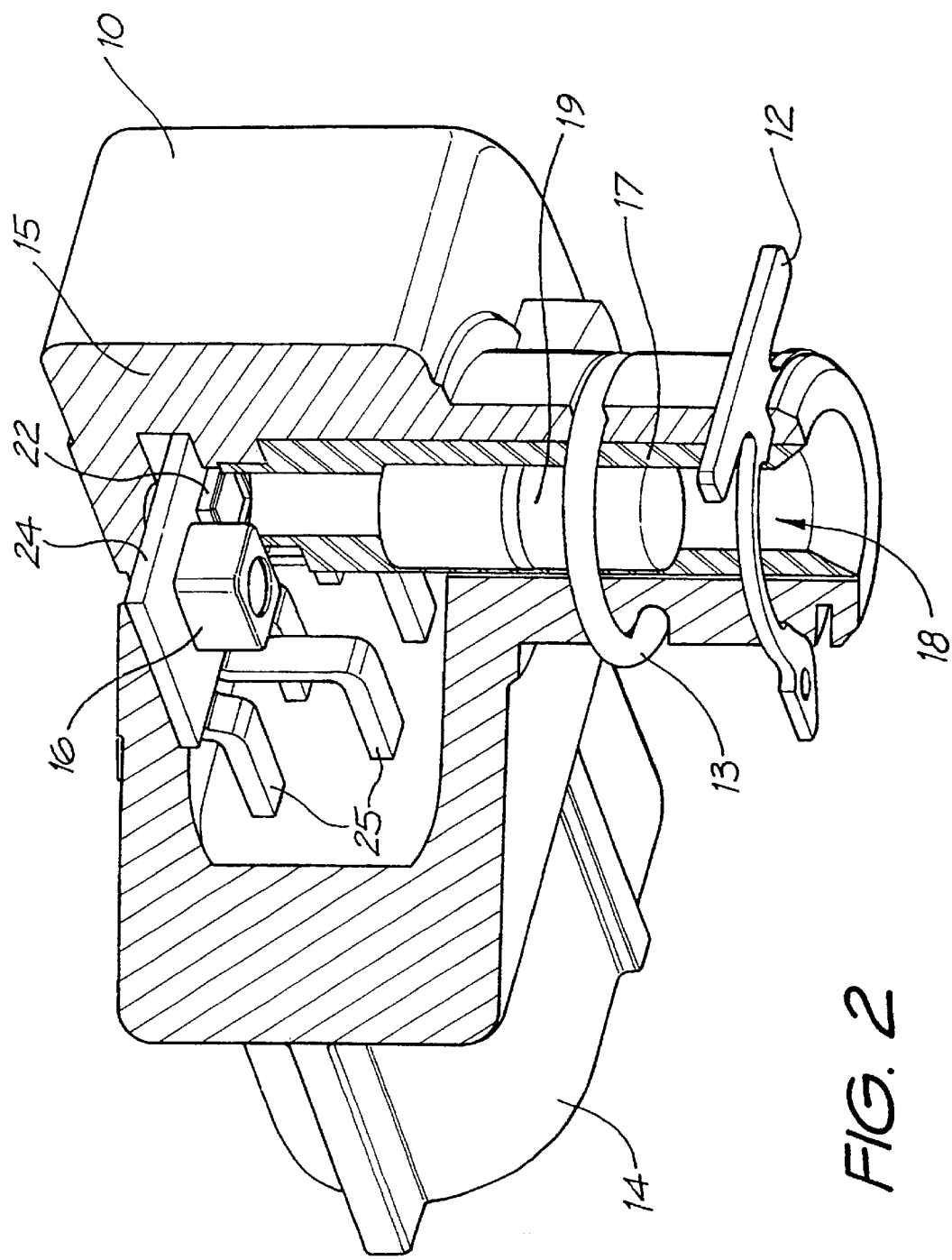
FIG. 2 shows a sectioned isometric view of the sensor module in FIG. 1 showing the relationships of the various components of the assembly.

FIG. 2 shows an isometric cross section of sensor module 10. EMR sources in the form of two LEDs 16 (only one visible in this view) irradiate cylindrical surfaces 7 and 8 via transparent tubular plastic light guide 17. LEDs 16 may operate in the visible spectrum, however infrared LEDs such as Siemens SFH480 Infrared Emitters have found to be most suitable for such vehicle-based sensor modules due to their wide operational temperature range.

EMR reflected from patterned surfaces 7 and 8 passes through bore 18 in tubular light guide 17 and is focussed by single spherical lens 19 as an image onto one dimensional arrays 20 and 21 respectively (refer to FIG. 4), these arrays forming part of the silicon architecture of ASIC 22. Lens 19 is axially fixed within bore 18 and may be made, for example, of transparent glass or polycarbonate material. Special surface coatings may be used to reduce optical aberration. A multi-lens system may alternatively be employed in the form of a composite planar-spherical lens arrangement (not shown) and an interposed iris (circular window) employed to increase the depth of field of the multi-lens system. Still alternatively other lens arrangements well known in the art of optics, could also be employed. For example, rather than classical refractive lens 19, the optical paths in sensor module 10 could be rearranged such that lens 19 is an internal or external reflective or diffractive lens component.

Processing means architecture 23 (refer to FIG. 4), also incorporated on ASIC 22, processes the image focussed onto one dimensional arrays 20 and 21 to determine the absolute and relative positions of patterned surfaces 7 and 8. ASIC processing means architecture 23 also converts this absolute and relative position data into absolute steering angle and torque data and converts this data into a serial protocol for output at plug 14. Alternatively, in an embodiment not shown, the output of ASIC 22 may be processed by a high level separate microcontroller chip such as a Motorola MC68376 which also is incorporated into sensor module 10. This allows very specific high-level processing of the ASIC output to be performed, as well as allowing more complex (and robust) serial communication protocols, such as CAN, to be easily employed. This microcontroller would then output the high level signals via plug 14.

Figure 4:
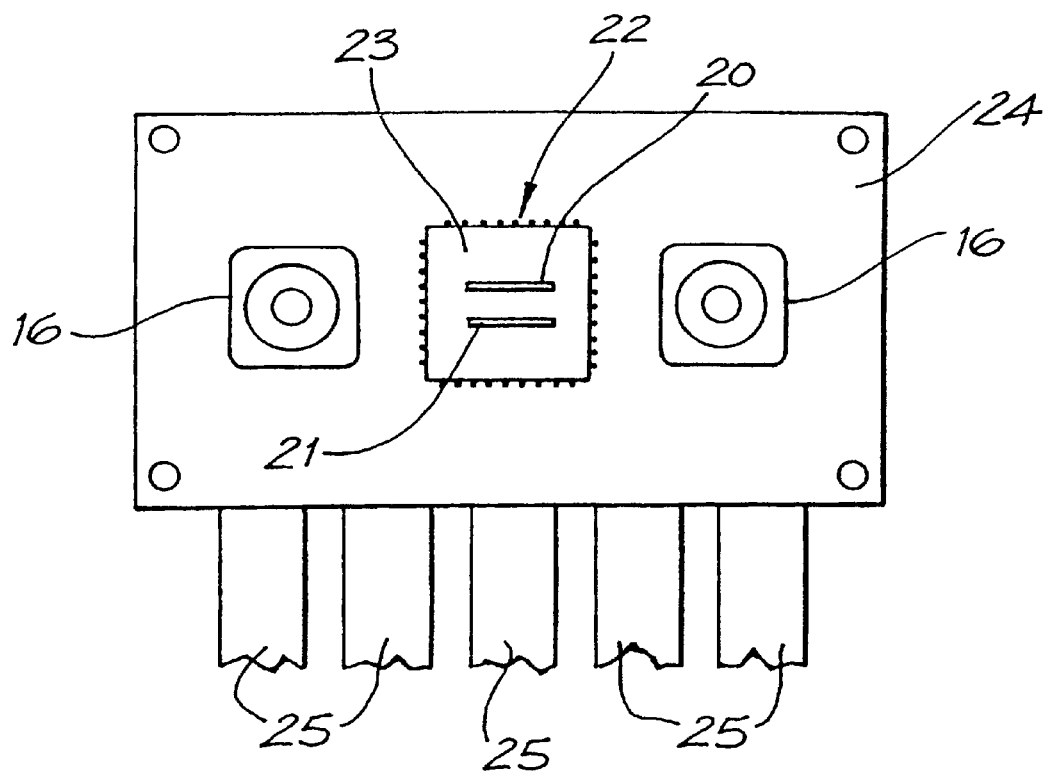
FIG. 4 shows the sensor module PCB with surface mounted ASIC and two LEDs.

All the opto-electronic components of sensor module 10 are surface mounted on PCB 24 (refer to FIG. 4). The pin connections 25 of plug 14 are also directly soldered to PCB 24 and hence electrically connect to ASIC 22. The pin connections of plug 14 also provide power supply inputs to PCB 24 in the form of one or more voltage rails (eg. +5 V and +12 V) and ground (0 V), and hence power the various opto-electronic components such as LEDs 16 and ASIC 22. The separate microtroller chip, earlier referred to, would also preferably be surface mounted on PCB 24 if it was incorporated.

Housing 15 of sensor module 10 is plastic injection moulded and retains all the fixed components of the sensing system in the correct spatial orientation with respect to each other to ensure correct functioning. The housing may be made of a high temperature, high strength and thermally stable plastic such as Hoechst FORTRON™. The moulded nature of the housing makes internal tampering impossible and ensures the sensor must be replaced as a unit, maintaining optimum system performance at all times.

Figure 3:
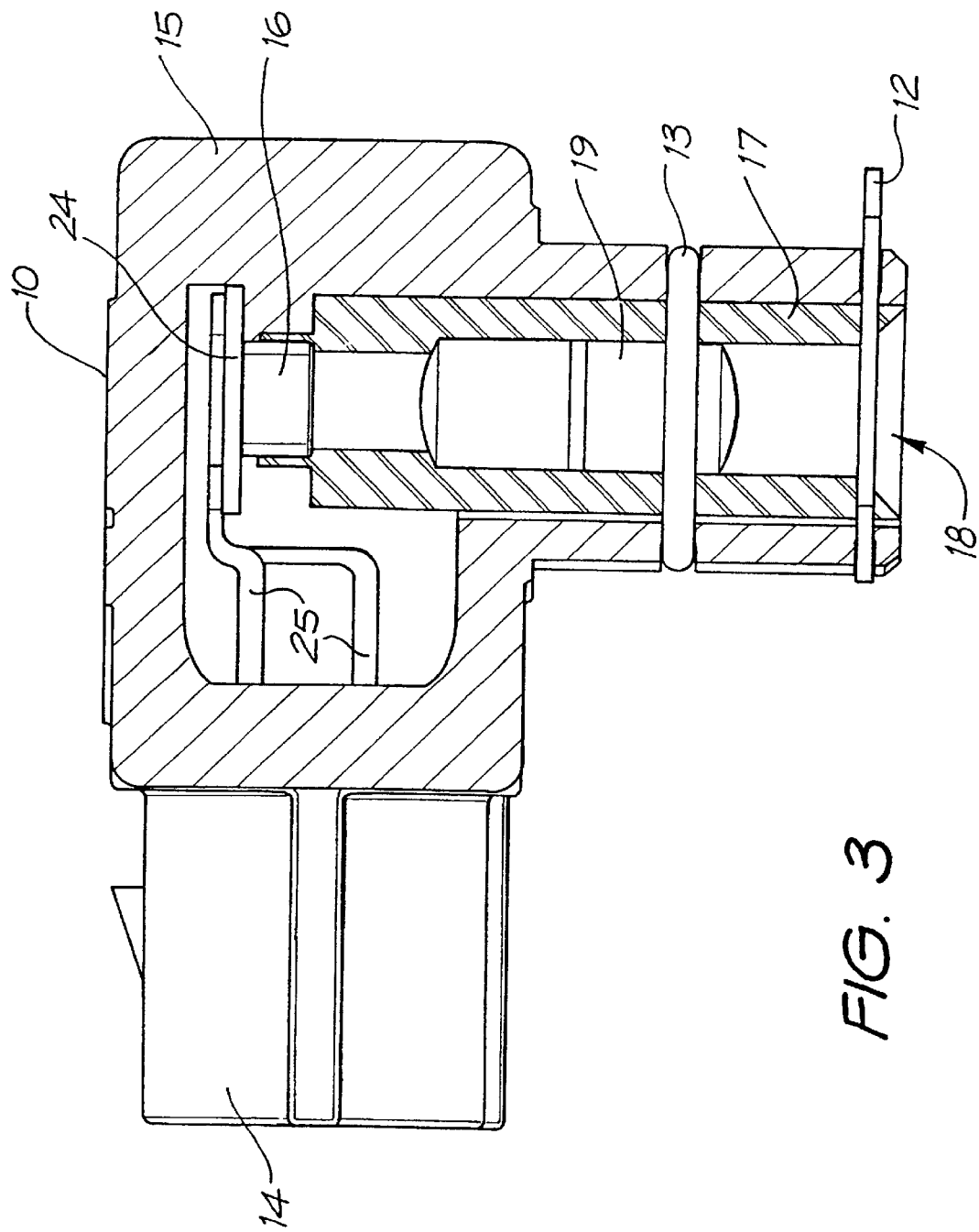
FIG. 3 shows a sectioned elevation of the sensor module in FIG. 1.

FIG. 3 shows a sectioned elevation of sensor module 10 and shows more clearly the geometric relationships of its components.

FIG. 4 shows ceramic PCB 24 with surface mounted ASIC 22 and two LEDs 16. Five pin connections 25 connect to the rear of PCB 24 and terminate at five-pin plug 14.

It should be obvious to those skilled in the art that numerous variations and modifications could be made to the sensor module without departing from the spirit and scope of the invention.

What is claimed is:

1. A sensor for determining the position of a moveable surface having patterned regions of high and low reflectivity to EMR, the sensor comprising an ASIC, at least one lens, and at least one EMR source, the ASIC comprising at least one array of EMR sensitive detectors and processing means, the EMR source facilitating illumination of the surface and the at least one lens facilitating the focusing of reflected EMR from the surface and generating an image on the at least one array of EMR sensitive detectors corresponding to the pattern on the surface, the ASIC, the at least one lens, and the at least one EMR source are all enclosed in a single housing providing accurate optical alignment of these elements and integrated as a single replaceable module, and the processing means of the ASIC facilitates processing of the image to determine the position of the pattern on the surface, wherein the ASIC and the at least one EMR source are both mounted on a PCB and the PCB is mounted in the housing.

2. A sensor as claimed in claim 1, wherein the housing of the sensor also comprises an electrical connector and the processing means also facilitates the outputting of a digital or analog electrical representation of the position to the electrical connector.

3. A sensor as claimed in claim 2, wherein the electrical connector comprises a multi-pin plug.

4. A sensor as claimed in claim 1, wherein the EMR emitted by the at least one EMR source passes through a light guide.

5. A sensor as claimed in claim 3, wherein the multi-pin plug also provides electrical power to the sensor.

6. A sensor as claimed in claim 1, wherein the at least one lens forms part of a lens system, the lens system comprising at least two lenses separated by an iris.

7. A sensor as claimed in claim 1, wherein the at least one lens is any one of a refractive, reflective or diffractive optical component.

8. A sensor as claimed in claim 1, wherein the at least one EMR source comprises a pulsed LED.

* * * * *